United States Patent [19]
Seabase

[11] 3,787,754
[45] Jan. 22, 1974

[54] APPARATUS FOR CONTROLLING CHARGING OF STORAGE BATTERIES WITH SENSING THE D.C. OF THE ELECTROLYTE

[75] Inventor: Paul L. Seabase, Sterling Heights, Mich.

[73] Assignee: The United States of America as represented by the Secretary of the Army, Washington, D.C.

[22] Filed: Aug. 16, 1972

[21] Appl. No.: 281,082

[52] U.S. Cl. .................................. 320/43, 324/29
[51] Int. Cl. ............................................. H02j 7/04
[58] Field of Search... 324/29, 29.5, 61; 331/65, 40; 320/43, 48, 30

[56] References Cited
UNITED STATES PATENTS 2,422,742   6/1947   Odessey ........................... 331/65 X
3,646,541   2/1972   Rathbun ........................... 331/65 X

FOREIGN PATENTS OR APPLICATIONS 1,125,044   9/1959   Germany .............................. 320/43

Primary Examiner—J. D. Miller
Assistant Examiner—Robert J. Hickey
Attorney, Agent, or Firm—Edward J. Kelly; Herbert Berl; R. M. Lyon

[57] ABSTRACT

My invention relates to a device for the testing or analyzing of batteries to determine whether such is chargeable or unchargeable, and more particularly, it relates to an electronic sensing system for automatically conducting and providing a readout display which is instantly indicative of the state of a given battery with respect to its chargeability.

6 Claims, 1 Drawing Figure

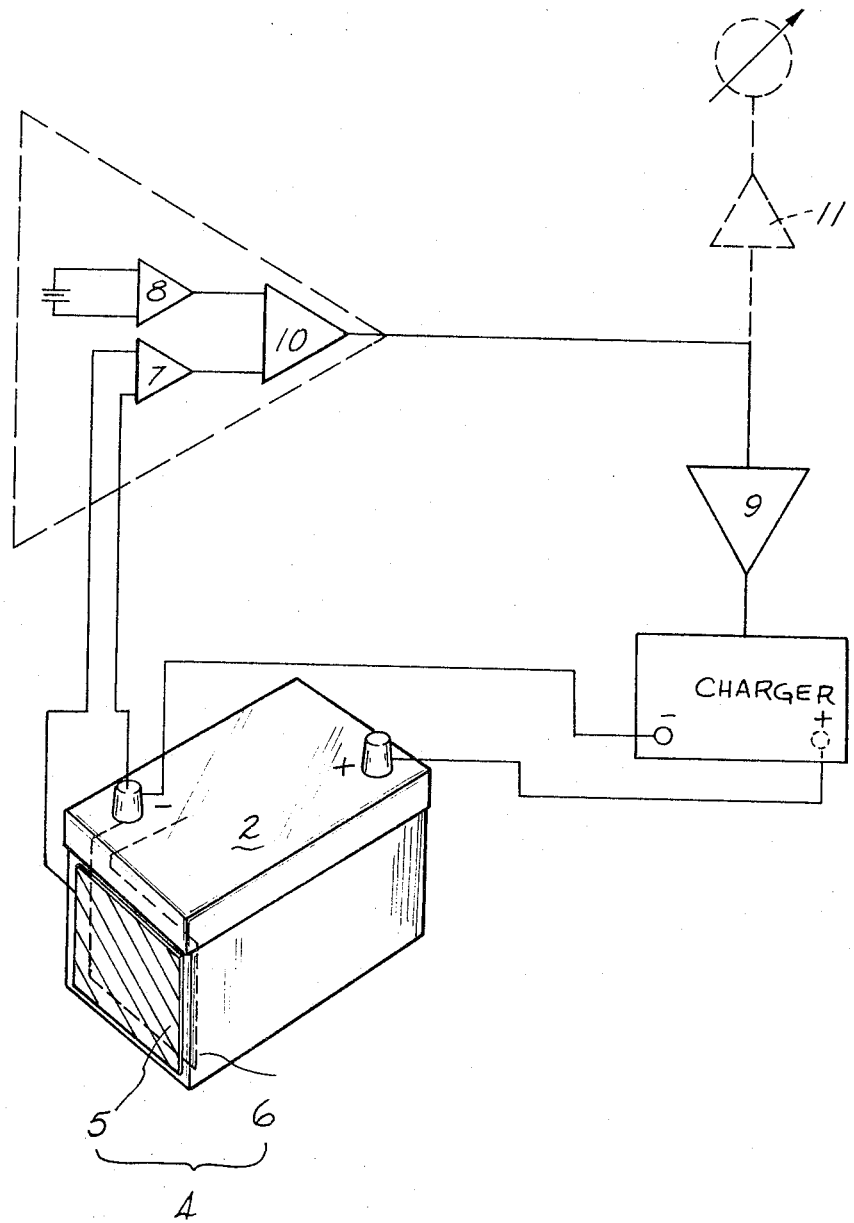

3,787,754

APPARATUS FOR CONTROLLING CHARGING OF STORAGE BATTERIES WITH SENSING THE D.C. OF THE ELECTROLYTE

The invention described herein may be manufactured, used, and licensed by or for the Government for governmental purposes without payment to me of any royalty thereon.

BACKGROUND OF THE INVENTION

Field of the Invention

In present vehicular application a charging source, generator or alternator-rectifier, impresses electrical energy to the storage battery. This energy flow, characterized by the current rate, is controlled by an electro-mechanical system which senses the battery voltage. This voltage regulator turns on the charging source, when the battery voltage drops below a specific value, and turns it off again when the voltage rises to a specific maximum. During the charging period the current rate is almost constant and it is not in accordance with the receptivity of the battery.

This invention relates to the change of frequency of a variable frequency oscillator which frequency change is brought about by the capacity variation of a capacitive sensor. The capacity variation of this sensor is caused by the change of the dielectric constant of the battery electrolyte which change is proportional to the state of charge level in the battery.

This invention seeks to avoid overcharging which is specifically unfavorable when in the cycling of the vehicle's battery a short high load period is followed by a relatively long charging period. The excess energy resulting from the overcharging produces excessive heat in the battery and unnecessary gas is formed by the electrolytic dissociation of the water present in the electrolyte. Overcharging does not directly cause the battery to fail prematurely but it contributes to its faster aging. It in effect shortens the cycling life by abnormally increasing the natural decay of the active electrode material.

In vehicular application the discharging halfcycle is uncontrollable because of the multitude of load components. It is utterly unpredictable when and how much load will be turned on and for how long and how often. Only the charging halfcycle allows any control.

Prior Art

A battery's state of charge testing program exists which comprises a series of closely timed alternating discharging and charging steps by which the chargeability of a battery could be determined with acceptable accuracy.

Devices for carrying out these methods have not been completely satisfactory because they depend on the operator to manually institute at least some of the charging and discharging steps in the test process. Accurate sequence timing of these steps is of utmost importance. Human errors have been quite common in the use of such prior art devices to the extent that the results obtained have had questionable values. The readout techniques utilized in such prior relatively unsophisticated devices have not had the desired combination of simplicity and exactness, so that a typical operator possessing only ordinary skills was susceptible to errors in reading his results.

It has already been proposed to use polar liquids of high purity as the dielectric medium in various apparatus exposed to intense electric fields.

Purified polar liquids have been found initially to possess very high dielectric properties unparalleled by most other categories of substances. As a drawback, however, it has been found that these high initial characteristics are not maintained but decrease sharply during the activation of the apparatus due to contamination of the liquid from various sources. Minute amounts of contaminant, such as small concentrations of material dissolved away from the wall surfaces of the vessels storing the liquids, are sufficient to cause a sharp drop in the dielectric properties of the liquid and consequently destroy the overall advantages expected from the use of polar liquids.

Prior attempts in overcoming the difficulty, by providing means for continually purifying the dielectric liquid during operation of the media in which it is used, consisted of providing means for a continuous circulation of the liquid through a closed flow circuit which comprises the apparatus and purifying means exterior to the apparatus. Circulator means were provided for continuously cycling the solution around the circuit so as to feed purified liquid into the apparatus. Such means have been found quite satisfactory in many cases where system dimensions and complexity do not constitute limiting factors. This method has made possible the continued pressure, within the electric field of the apparatus, of a pure polar liquid having resistivity and dielectric characteristics of values heretofore unattainable by other means. An arrangement of such type is entirely unsuitable in a great many applications and it would be extremely difficult to achieve the high dielectric values of polar liquids in a permanent manner throughout the service life of the apparatus involved, without providing the complicated equipment comprising the fluid circulating and purifying means as well as the excess body of liquid inherently present in such a set up.

The presently used conventional method of measuring the state of charge of lead-acid storage batteries consists of checking the specific gravity of the electrolyte with a hydrometer. The latter method has several shortcomings which reduce the accuracy of the measurement as well as reducing the practical application of it in the automotive field.

The hydrometer method cannot be used on vehicles which are in motion. It can only be utilized while the vehicle is completely immobilized and the battery at rest. The method can only be used for making spot checks and is impractical for continuous monitoring of the storage battery's state of charge. Further, the hydrometer readings are affected by temperature since a change of temperature causes a change in the electrolyte's density.

Another method which offers a partial solution for the measurement of the state of charge in storage batteries is the "resonance method."

SUMMARY OF THE INVENTION

In the process which occurs through the cycling of a lead-acid storage battery simultaneous electrical and electro-chemical phenomena are involved. It is not possible to directly express the state of charge of a lead-acid storage battery by an explicit mathematical relation. In the development of a regulated charging system knowledge of the state of charge of the system is necessary. A controlled charging system can be developed if the state of charge may be accurately determined.

The direct measurement of small capacity differences is complicated and difficult to perform. Unavoidable component capacitances make the measurements uncertain. When the sensor capacity is incorporated as a capacitive component into a high frequency oscillatory system, the capacity variation of the sensor causes a variation in the oscillator's frequency. This frequency variation is easier to handle. In the system the unaccountable stray capacitances can be compensated or cancelled out automatically.

If the reference frequency of the oscillator is set at the reference condition of the battery (full charge or normal discharge state), the frequency variation ensuing during the battery's cycling is proportional to the variation of the state of charge.

The measurement of high frequencies is not simple and requires specific and sophisticated equipment. It is feasible only for closely controlled laboratory conditions. Such method which offers a complete solution to the practical and accurate measurement of the state of charge of a lead-acid battery is the basis of my invention.

The method incorporates two oscillators instead of one. One is the reference oscillator and is a fixed frequency crystal controlled system. The second oscillator is a variable frequency oscillator (VFO). This VFO contains in its circuit capacity, as a component, the capacitive sensor. In its circuit, the only other variable capacity component is a small trimmer used for alignment to reference. At normal discharge state aligning the variable frequency oscillator with the crystal oscillator feeds the output into a mixer stage. When the frequency of both oscillators is equal then the output of the mixer will be zero beat. The indication of reference alignment is zero output from the mixer.

The electrolyte of a typical and common lead-acid storage battery is diluted sulphuric acid ($H_2SO_4$) having a specific gravity of 1.280. When the battery is being discharged, by the electrochemical reaction, a specific amount of $H_2SO_4$ is converted to lead sulfate ($PbSO_4$) and water ($H_2O$) which is likewise a by-product of this reaction. During this reversible process the specific gravity of the electrolyte decreases to approximately 1.220.

In the opposite charging process $PbSO_4$ molecules in the electrodes are electrolytically broken down and the sulfate ion ($SO_4^=$) recombines with hydrogen ($H_2$) from the water while free oxygen ($O_2$) and hydrogen ($H_2$) are generated as by-products and escape from the electrolyte.

The molecular ratio of the electrolyte's two components always corresponds to an actual and specific state of charge and this is always independent of the temperature's influence. The electrolyte has a specific dielectric constant which depends only on the molecular ratio of the component ingredient — namely aqueous sulphuric acid. When the molecular ratio of the sulphuric acid and water changes proportionately with the state of charge, then the dielectric constant also changes in the same proportion. By increasing the sulphuric acid's concentration the dielectric constant is decreased. The latter occurs during charging. The dielectric constant increases with decreasing concentration of sulphuric acid which occurs when the battery is discharging.

It is possible to measure the dielectric constant of the battery's electrolyte directly, which measurement shall be an indication of its corresponding state of charge. Indirectly this measurement may be performed by simple means, namely measuring the capacity variation of a capacitor sensor in which the dielectric constant of the particular electrolyte is the only variable magnitude.

Because the battery's electrolyte is an electrically conductive material the armatures of the sensor capacitor must be separated from each other. To accomplish this separation an insulating layer is sufficient on one of the armatures. Although the capacity of the sensor will be determined by a combined dielectric constant, its capacity variations will occur only as a result of the variations of the dielectric constant of the electrolyte. Such capacitive sensor can be applied on the battery without disturbing its structural integrity. The outermost negative electrode at the negative battery terminal is engaged as one armature of the sensor while the other armature may be a metal plate adherent to the outside of the container and opposite to the negative electrode adjacent to the container wall. The dielectric sensor will be located between the negative electrode and the container wall close to the electrolyte.

The contact area of the thus formed sensor capacitor is determined by the overall dimensions of the armature plate which must be slightly smaller than its opposite armature, the negative electrode.

All of the well known methods and arrangements available in the art, including the resonance method, allow quite accurate measurements but are practical for laboratory use only. These methods require manual resetting of the resonance and complicated charging system control.

It is an object of the present invention to provide a simplified apparatus and method for the automatic testing of the state of charge of a lead-acid storage battery.

It is another object of the present invention to provide an apparatus which will indicate the state of charge of a lead-acid storage battery at any time, whether the battery is in the operating or resting stage.

It is yet an object of my invention to provide a battery charge tester which senses the variation of the dielectric constant of the storage battery's electrolyte.

It is still another object of the instant invention to provide a novel method and apparatus for indicating the state of charge of storage batteries which is controlled automatically according to the inherent charging characteristics of the storage battery.

It is also another object of the instant invention to provide an apparatus possessing a high dielectric constant which will greatly improve operating characteristics over comparable apparatus of conventional character.

Further objects and advantages of the present invention will be apparent from the following description, reference being made to the accompanying drawing which shows the charger apparatus and method disclosed herein.

BRIEF DESCRIPTION OF THE DRAWING

The accompanying drawing is a block diagram of the beat frequency method, closed loop system, embodying one example of the invention.

DESCRIPTION OF THE PREFERRED EMBODIMENT

When a battery 2 is being charged the dielectric constant of its electrolyte 3 will decrease proportionally with the progress of the charging, namely with the build-up of the state of charge. As a result there is a decrease in the capacity of sensor 4, comprised of outside armature 5 and negative electrode 6, and consequently the frequency of the variable frequency oscillator (VFO) 7 will shift upwards thus becoming larger than the frequency of crystal oscillator 8. The output of mixer 10 is the difference between the two input oscillators 7 and 8 which is an actual beat frequency. This beat frequency will increase when the state of charge is increased. The range of the beat frequency output can vary from 0 to 10,000 audio frequency. This audio frequency signal is fed into a system which by direct readout indicates the state of charge. It may also be used as a signal for triggering the charger regulating system which adjusts the charging current corresponding to the state of charge to the correlated receptivity of the battery.

The two oscillators 7 and 8 together with the mixer 10 stage incorporate a beat frequency oscillator. Regulator 9 which effects the control of the current is a separate system incorporated to the beat frequency oscillator.

At reference condition variable frequency oscillator 8 is aligned with a variable capacity component of the circuit capacity to resonance with the crystal frequency. At this point the output of the mixer stage is zero beat. It is preferred to take the normal discharge state as reference condition.

When the charging begins the dielectric constant of electrolyte 3 and the capacity of sensor 4 will change. The dielectric constant of electrolyte 3 will decrease as will the capacity of sensor 4. The output of mixer 10 is the difference between the two frequencies, namely the beat frequency and the variable frequency. The frequency of the variable frequency oscillator is larger than that of the reference. The noted frequency difference increases with the build-up progress of the state of charge.

The small change in the dielectric constant causes a similarly slight change in sensor 4 capacity wherein the output of the beat frequency of the system will be in the range of audio frequencies. The system can be so designed that the range of the beat frequency oscillator output shall range from 0 to 10,000 audio frequencies. The frequency signal from the beat frequency oscillator (BFO) system is used as an input to a visual readout system as well as an input for a current regulating system.

The audio frequency output of the BFO is proportional to the state of charge as the variation of the dielectric constant of sensor 4 capacity. As a result specific beat frequencies are correlated to specific points of the state of charge function. The quoted points will be points at which the current should be decreased for regulated charging; the correlated beat frequencies may be utilized to trigger the regulating system.

The input of regulator 9 must have as many narrow bandpass filters as there are triggerpoints. It is then that these filters will pass only the specific trigger frequencies to a switching system. This two way control of the charging current makes it virtually impossible for the battery's discharge to go beyond an allowable limit. It will limit the current rate approximately to the receptivity and thus greatly reduce the development of heat and electrolytic dissolution losses which are the normal consequences of a constant current charging.

The audiofrequency output of the BFO is proportional to the state of charge. This signal is impressed into direct reading audiofrequency meter 11 wherein the instrument can be calibrated directly in terms of state of charge.

Such visual readout is important in vehicles wherein the actual value of the state of charge is necessary with respect to cranking capability of the engine. The lowest state of charge, at which a full start is possible, could even be red-marked on visual readout scale 11.

Indirectly the visual readout may also be used to judge the aging of the battery or monitoring its condition. Aging would be readily noticeable by a gradual decrease of the maximum state of charge at completed charging and the condition of the battery could be monitored quantitatively. An impending or beginning cell failure would show up as an inadequate state of charge after a prolonged charging. A slow creeping decrease of the state of charge during idle periods would change to a more rapid rate which is mainly due to internal leakage. Additionally visual readout of the state of charge would also be important and desirable for a periodic maintenance check.

The entire system is transistorized and the relatively negligible current drain makes it possible to operate the instrument from a self-contained battery. In vehicular applications it is preferred to use the vehicle's battery itself as a power source.

The VFO of the monitoring system is very sensitive to the variation of the driving voltage, consequently it is desirable to secure a steady driving voltage for it in vehicles. This can be achieved when the power takeoff from the vehicular battery occurs by a Zener diode which limits the voltage lower than the cutoff voltage of the regulator. The preferred limit is 9 volts.

The reference capacity of sensor 4 must be relatively large because the variation of the dielectric constant of electrolyte is subtle between normal discharge and full charge state. Keeping sensor 4 capacity large enough, a measurable capacity variation is obtained by the variation of the electrolyte's dielectric constant.

I wish it to be understood that I do not desire to be limited to the exact details of description shown and since various changes and modifications may be made in the invention without departing from the spirit and scope of the invention as described hereinabove and as defined in the following claims.

I claim:

1. In combination: a battery of the wet cell type; a charging source for the battery; an armature capacitively coupled to a plate of the battery through the battery electrolyte means coupled therewith for generating a variable frequency signal representative of the electrolyte's dielectric constant; a regulator means for limiting the the current delivered from the charging source to the battery; and means responsive to the variable frequency signal for automatically adjusting and changing the current limit setting of the regulator means so that throughout the charge cycle the charging current is set at values which are inversely proportional to the dielectric constant of the electrolyte.

2. The combination of claim 1 wherein the frequency-responsive adjusting means comprises a beat frequency oscillator system.

3. The combination of claim 2 wherein the beat frequency oscillator system comprises a fixed frequency reference oscillator powered by the aforementioned battery.

4. The combination of claim 1 wherein the frequency-responsive adjusting means comprises a beat frequency oscillator system containing a first fixed frequency reference oscillator and a second variable frequency oscillator, said second oscillator being powered by the aforementioned variable frequency signal; said first and second oscillators being interconnected so that the output of the oscillator system represents the frequency difference of the two oscillator outputs.

5. The combination of claim 4 wherein the oscillator system is adjusted so that the beat frequency output is zero when the battery is in the discharged state.

6. The combination of claim 1 wherein the regulator means includes an input having a plurality of different narrow bandpass filters, each capable of passing a different frequency signal received from the aforementioned adjusting means; said regulator means including an output which comprises a switching system triggered by the input signals so that the battery charging current is relatively large when the battery approaches the discharged state and relatively small when the battery nears the charged state.

* * * * *